US008582711B2

(12) United States Patent
Tsushita

(10) Patent No.: US 8,582,711 B2
(45) Date of Patent: Nov. 12, 2013

(54) CLOCK CHANGE DEVICE AND CLOCK CHANGE METHOD

(75) Inventor: Katsuya Tsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 12/797,834

(22) Filed: Jun. 10, 2010

(65) Prior Publication Data
US 2010/0246737 A1 Sep. 30, 2010

Related U.S. Application Data

(63) Continuation of application No. PCT/JP2007/074708, filed on Dec. 21, 2007.

(51) Int. Cl.
*H04L 7/00* (2006.01)

(52) U.S. Cl.
USPC ........................................... 375/372

(58) Field of Classification Search
USPC ............... 375/354, 377, 371, 372; 365/233.1, 365/233.11, 233.12, 233.18, 230.01, 365/189.011, 219, 220, 221; 341/50, 100, 341/101
See application file for complete search history.

(56) References Cited

U.S. PATENT DOCUMENTS

| 4,171,538 A * | 10/1979 | Sheller ........................... 711/170 |
| 5,030,951 A * | 7/1991 | Eda et al. ...................... 341/100 |
| 5,056,120 A | 10/1991 | Taniguchi et al. |
| 5,243,626 A * | 9/1993 | Devon et al. .................. 375/239 |
| 5,363,418 A * | 11/1994 | Nakano et al. ................ 375/369 |
| 5,473,577 A * | 12/1995 | Miyake et al. ................ 365/238 |
| 6,807,261 B2 * | 10/2004 | Takahashi et al. ............ 379/156 |

FOREIGN PATENT DOCUMENTS

| JP | 2-27834 | 1/1990 |
| JP | 2-285735 | 11/1990 |
| JP | 5-219037 | 8/1993 |

OTHER PUBLICATIONS

English language International Search Report for PCT/JP2007/074708, mailed on Feb. 12, 2008.

* cited by examiner

*Primary Examiner* — Sam K Ahn
*Assistant Examiner* — Vineeta Panwalkar
(74) *Attorney, Agent, or Firm* — Staas & Halsey LLP

(57) ABSTRACT

A clock change method includes: converting the serial data synchronized to a first clock into parallel data; latching the serial-to-parallel converted data into a designated data storing circuit with a latch timing that occurs once in every a number of clock cycles of a second clock; and converting the latched parallel data into the serial data synchronized to the second clock, and wherein: each time a packet of serial data synchronized to the first clock is received, a timing adjustment is performed to adjust the latch timing so that the latch timing occurs a predetermined time after occurrence of a conversion timing for converting the serial data synchronized to the first clock into the parallel data.

14 Claims, 17 Drawing Sheets

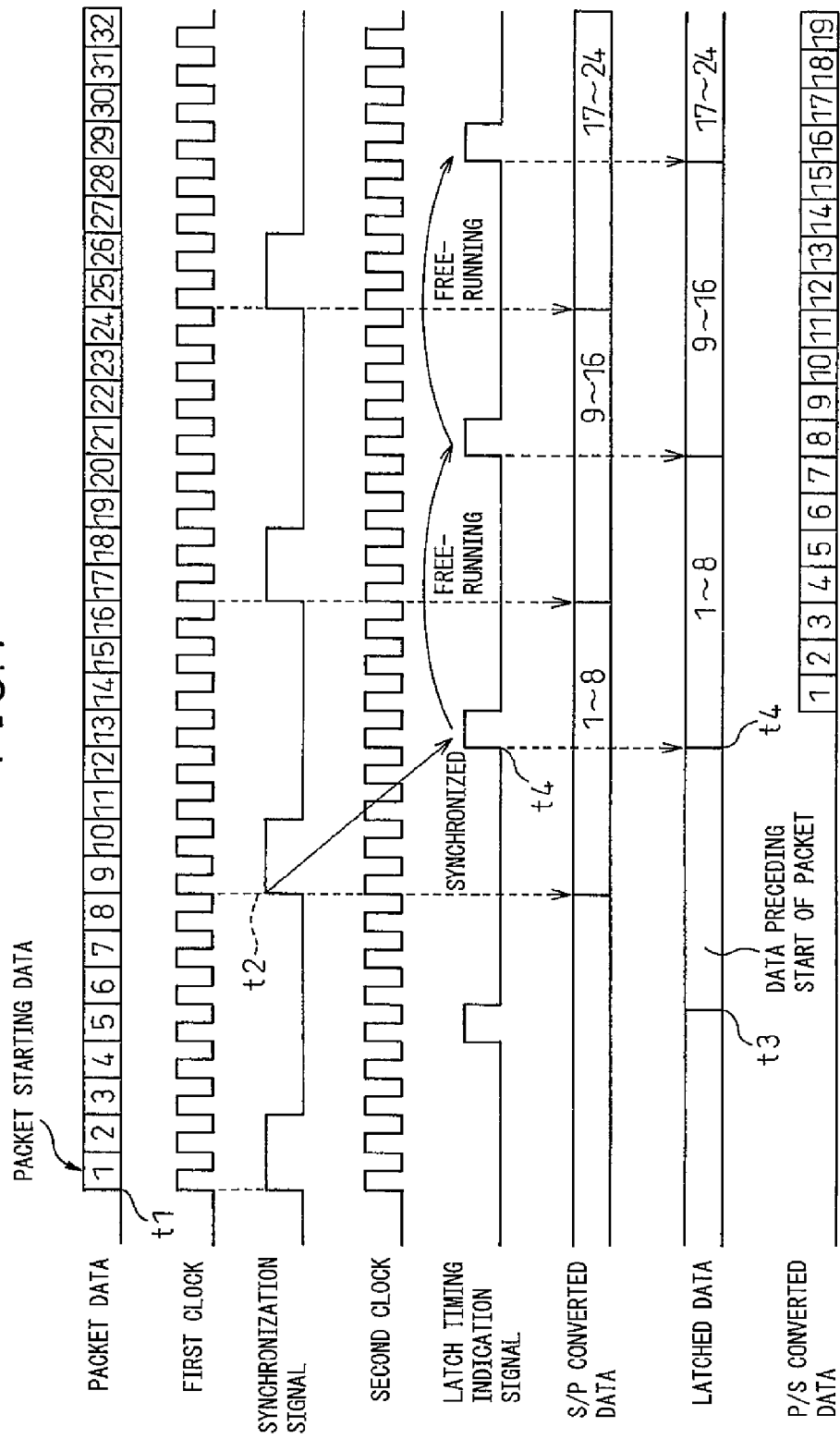

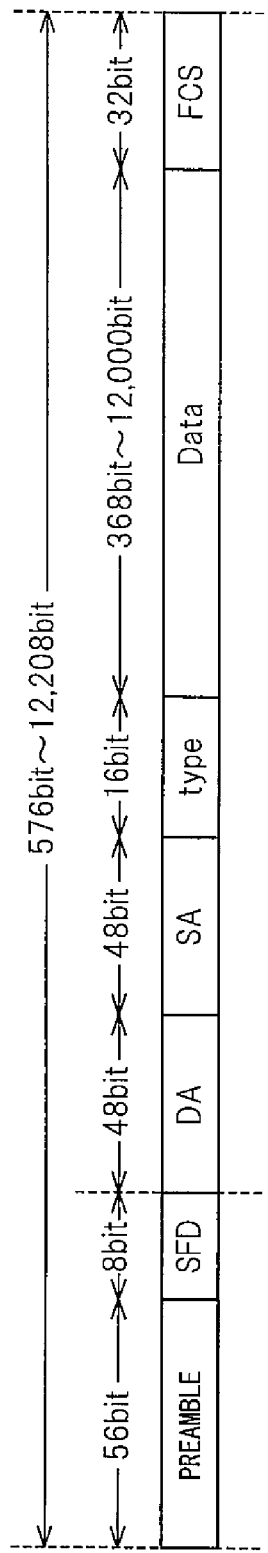

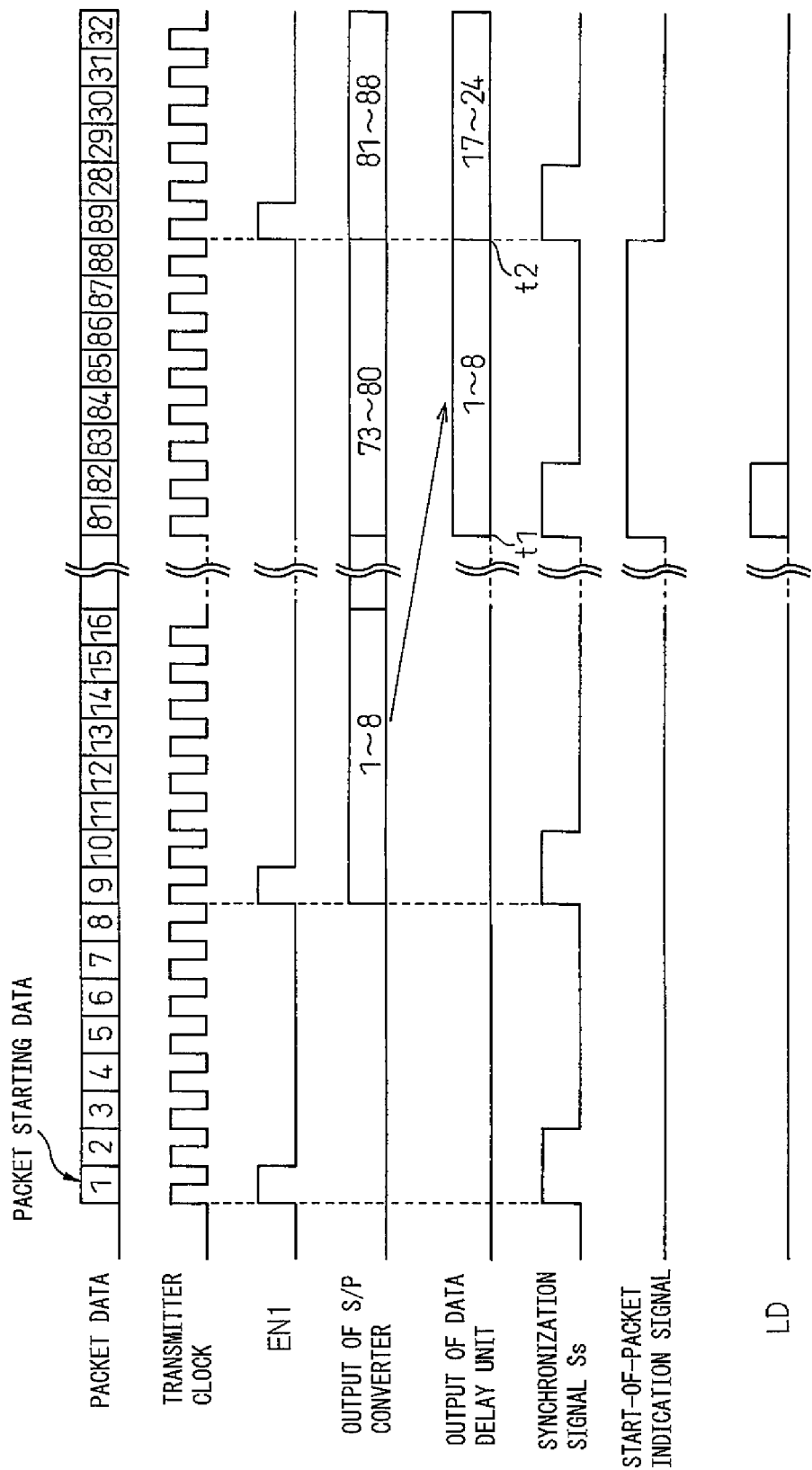

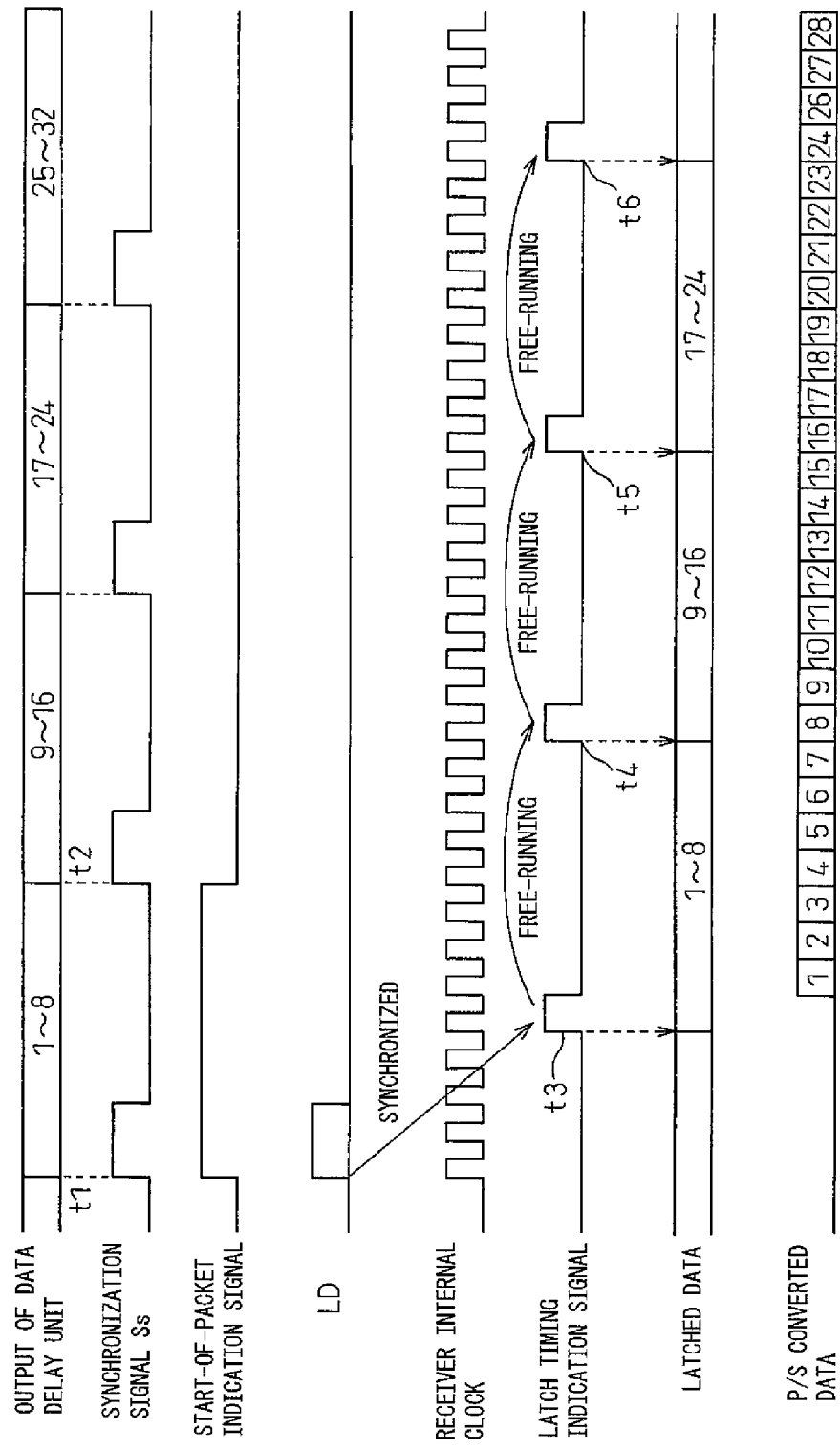

200
CLOCK CHANGE DEVICE AND CLOCK CHANGE METHOD

CROSS-REFERENCE TO RELATED APPLICATIONS

The present application is a continuation application based on International application No. PCT/JP2007/74708, filed on Dec. 21, 2007.

FIELD

The embodiments discussed herein are related to a clock change device and clock change method for converting an input signal synchronized to a transmitter clock into a signal synchronized to another clock signal in a communication apparatus and communication method that transfer data in packet form.

BACKGROUND

When a signal synchronized to a first clock signal having a given frequency and phase is received by a receiver running on its own internal clock, i.e., a second clock signal, the received signal is converted into a signal synchronized to the second clock signal so that the received signal can be processed within the receiver. This conversion will hereinafter be referred to as "clock change." FIG. 1 is a diagram illustrating a first example of the clock change process practiced in the prior art. In the prior art clock change process the received packet data is written to a memory 101 with timing synchronized to the first clock signal CLKt (hereinafter described as the "transmitter clock" in this patent specification) to which the packet data is synchronized. After that, the data is read out of the memory 101 with timing synchronized to the second clock signal CLKr used within the receiver (hereinafter referred to as the "receiver internal clock" in this patent specification), to accomplish the clock change.

For the memory 101 used for the clock change, use can be made of a dual-ported RAM or a FIFO memory. The clock deviation before and after the clock change, i.e., the difference between the transmitter clock CLKt and the receiver internal clock CLKr, can be accommodated by starting to read out the data after a certain amount of data has been accumulated in the memory 101. When the write clock is faster than the read clock, i.e., when the transmitter clock CLKt is faster than the receiver internal clock CLKr, the amount of data accumulated in the memory 101 increases, as depicted in FIG. 2A. Conversely, when the write clock is slower than the read clock, i.e., when the receiver internal clock CLKr is faster than the transmitter clock CLKt, the amount of data accumulated in the memory decreases. A capacity monitoring unit 102 is provided to determine the read start timing of the memory 101 and to check for the presence or absence of data in the memory 101.

FIG. 3 is a diagram illustrating a second example of the clock change process practiced in the prior art. In this method, serial data to which the clock change is to be applied is serial-to-parallel converted by a serial-parallel converter (S/P converter) 111 by sampling the data at sampling times synchronized to the transmitter clock. Since the serial-to-parallel converted data changes with a period equal to (the period of the transmitter clock CLKt)☐(the number of bits in the parallel data), the period when the data remains unvarying (hereinafter referred to as the "unvarying period")becomes longer than that of the original serial data. The unvarying period is thus extended by the serial-to-parallel conversion, and during the unvarying period, the data is converted into serial data synchronized to the receiver internal clock CLKr. In the example illustrated in FIG. 3, the parallel data is stored in a data storing unit 112 during the unvarying period of the parallel data, and the parallel data stored in the data storing unit 112 is converted by a parallel-serial converter 113 into the serial data synchronized to the receiver internal clock.

In the example of FIG. 3, in order to latch the parallel data into the data storing unit 112 at or near the midpoint of the unvarying period, there is provided a timing signal generating unit 114 which generates a latch timing signal that determines the timing for latching the parallel data into the data storing unit 112. The latch timing signal is a signal that rises with a period equal to (the period of the transmitter clock CLKt)☐ (the bit width of the parallel data) and falls with a period equal to (the period of the receiver internal clock CLKr)☐(the bit width of the parallel data). FIG. 4 is a time chart illustrating the clock change process depicted in FIG. 3. The time chart here represents the timing in which the serial data synchronized to the transmitter clock CLKt is converted into 8-bit parallel data by the serial-parallel converter 111. The latch timing signal is generated so that its rising edge is synchronized to a clock whose period is eight times the period T1 of the transmitter clock CLKt and so that its falling edge is synchronized to a clock whose period is eight times the period T2 of the receiver internal clock CLKr.

In the example of FIG. 4, the conversion by the serial-parallel converter 111 is performed in synchronism with the rise timing of the latch timing signal. The falling edge of the latch timing signal is used to latch the data into the data storing unit 112. Further, the rise and fall timings are set so that the latch timing signal has a 50% duty cycle. In this way, the time at which to latch the parallel data into the data storing unit 112 can be set at or near the midpoint of the unvarying period of the parallel data.

If there is a clock deviation between the transmitter clock CLKt and the receiver internal clock CLKr, the duty cycle of the latch timing signal deviates from 50%, and as a result, the time at which to latch the parallel data into the data storing unit 112 becomes displaced from the midpoint of the unvarying period of the parallel data. The timing signal generating unit 114 adjusts the falling edge position of the latch timing signal so as to maintain the duty cycle of the latch timing signal at 50%. However, if the falling edge position of the latch timing signal is adjusted, a data dropout or data duplication may occur when performing the parallel-to-serial conversion. How such errors can occur will be described with reference to FIGS. 5A, 5B, 6A, and 6B.

FIG. 5A is a diagram illustrating the case where the transmitter clock CLKt is faster than the receiver internal clock CLKr. If the transmitter clock CLKt is faster than the receiver internal clock CLKr, the fall timing of the latch timing signal delays, as a result of which the period TH during which the latch timing signal is held at "H" becomes longer than the period TL during which it is held at "L", as illustrated, and the duty cycle of the latch timing signal thus deviates from 50%.

Suppose that the timing signal generating unit 114 advanced the falling edge position of the latch timing signal by one receiver internal clock CLKr, as depicted in FIG. 5B, in an attempt to maintain the duty cycle of the latch timing signal at 50%. In this case, since the contents stored in the data storing unit 112 are updated before all the bits in the parallel data stored in the data storing unit 112 are converted into the serial data by the parallel-serial converter 113, a data dropout occurs in the resulting serial data.

FIG. 6A is a diagram illustrating the case where the receiver internal clock CLKr is faster than the transmitter clock CLKt. If the receiver internal clock CLKr is faster than the transmitter clock CLKt, the period TH during which the latch timing signal is held at "H" becomes shorter than the period TL during which it is held at "L", as illustrated, and the duty cycle of the latch timing signal thus deviates from 50%.

Suppose that the timing signal generating unit 114 retarded the falling edge position of the latch timing signal by one receiver internal clock CLKr, as depicted in FIG. 6B. In this case, since the contents stored in the data storing unit 112 are not updated, when all the bits in the parallel data stored in the data storing unit 112 are converted into the serial data by the parallel-serial converter 113, data duplication occurs in the resulting serial data.

Related art is disclosed in Japanese Laid-open Patent Publication No. H02-027834.

SUMMARY

According to one embodiment, there is provided a clock change device including: a serial-parallel conversion unit which converts the serial data synchronized to a first clock into parallel data; a data storing unit which latches the parallel data from the serial-parallel conversion unit with a latch timing that occurs once every a number of clock cycles of a second clock; a parallel-serial conversion unit which converts the parallel data stored in the data storing unit into the serial data synchronized to the second clock; and a timing adjusting unit which, each time a packet of serial data synchronized to the first clock is received, performs a timing adjustment to adjust the latch timing so that the latch timing occurs a time after occurrence of a conversion timing of the serial-parallel conversion unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWING(S)

FIG. 7 is a time chart for illustrating a clock change method;

FIG. 11 is a diagram illustrating the format of an Ethernet (registered trademark) packet;

FIG. 14 is a time chart (part 1) illustrating signals at various parts of the clock change unit depicted in FIG. 10;

FIG. 15 is a time chart (part 2) illustrating signals at various parts of the clock change unit depicted in FIG. 10;

DESCRIPTION OF EMBODIMENT(S)

Figure 1:
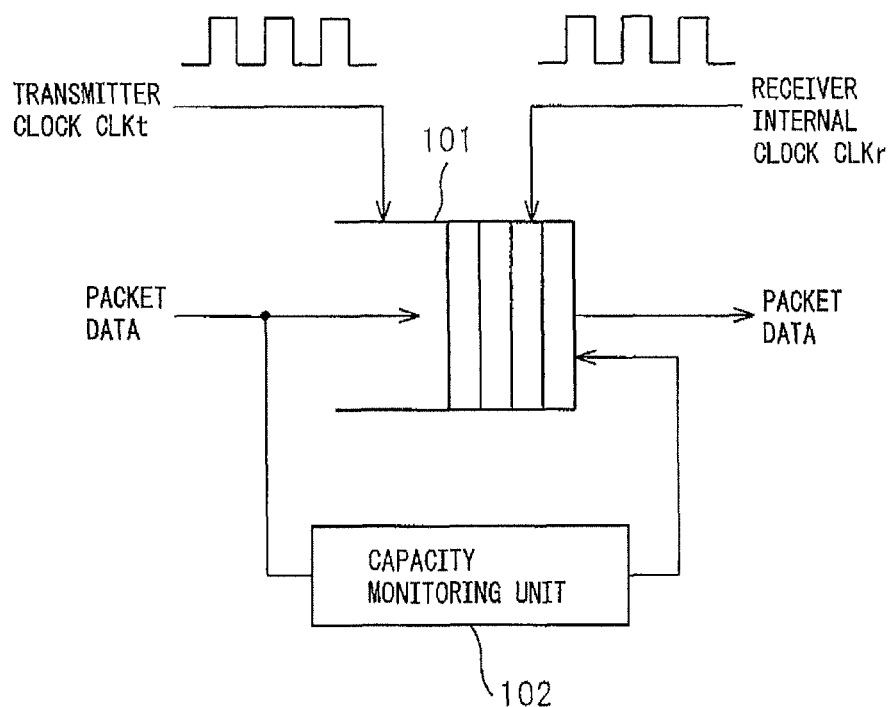
FIG. 1 is a diagram illustrating a first example of the clock change process practiced in the prior art.
Figure 2A:
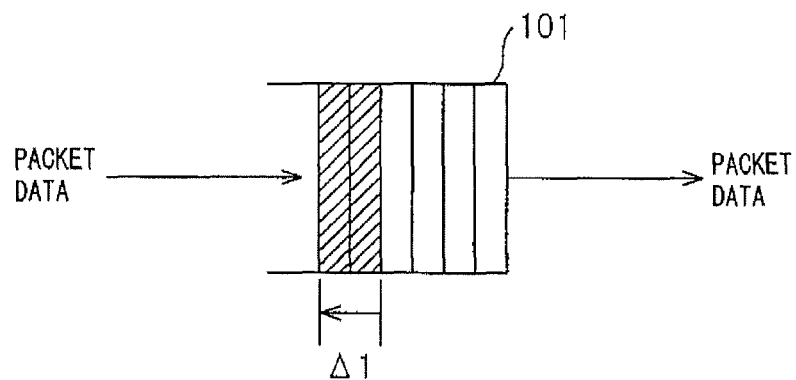
FIG. 2A is a diagram illustrating the case where the transmitter clock is faster than the receiver internal clock.
Figure 2B:
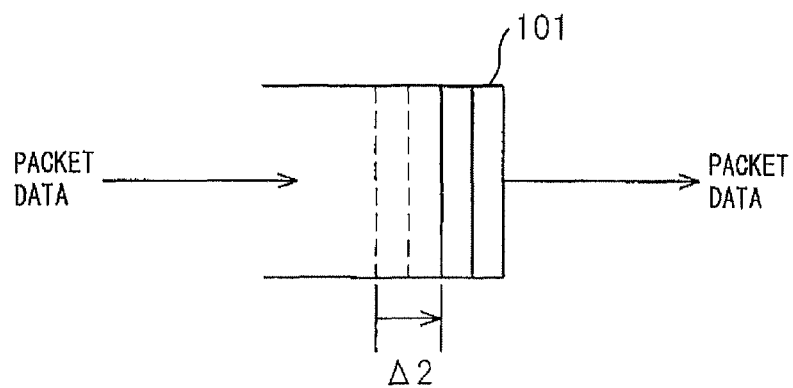
FIG. 2B is a diagram illustrating the case where the receiver internal clock is faster than the transmitter clock.
Figure 3:
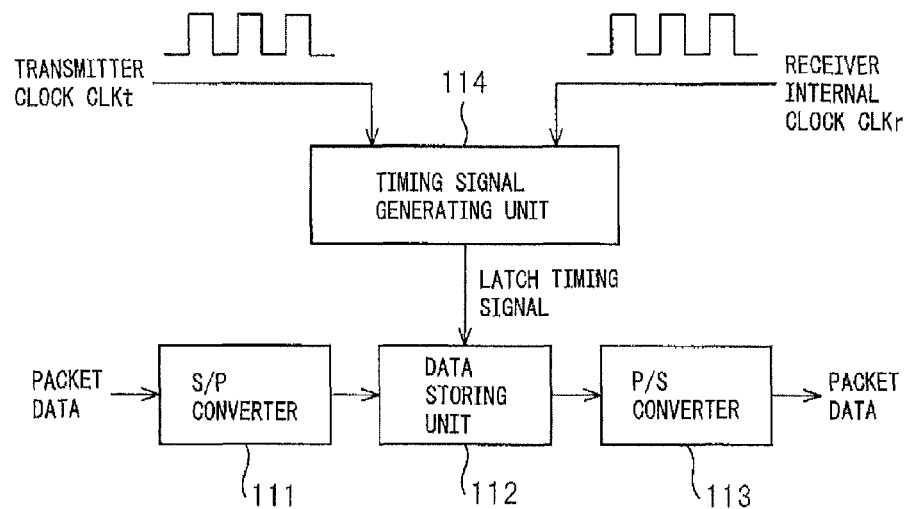
FIG. 3 is a diagram illustrating a second example of the clock change process practiced in the prior art.
Figure 4:
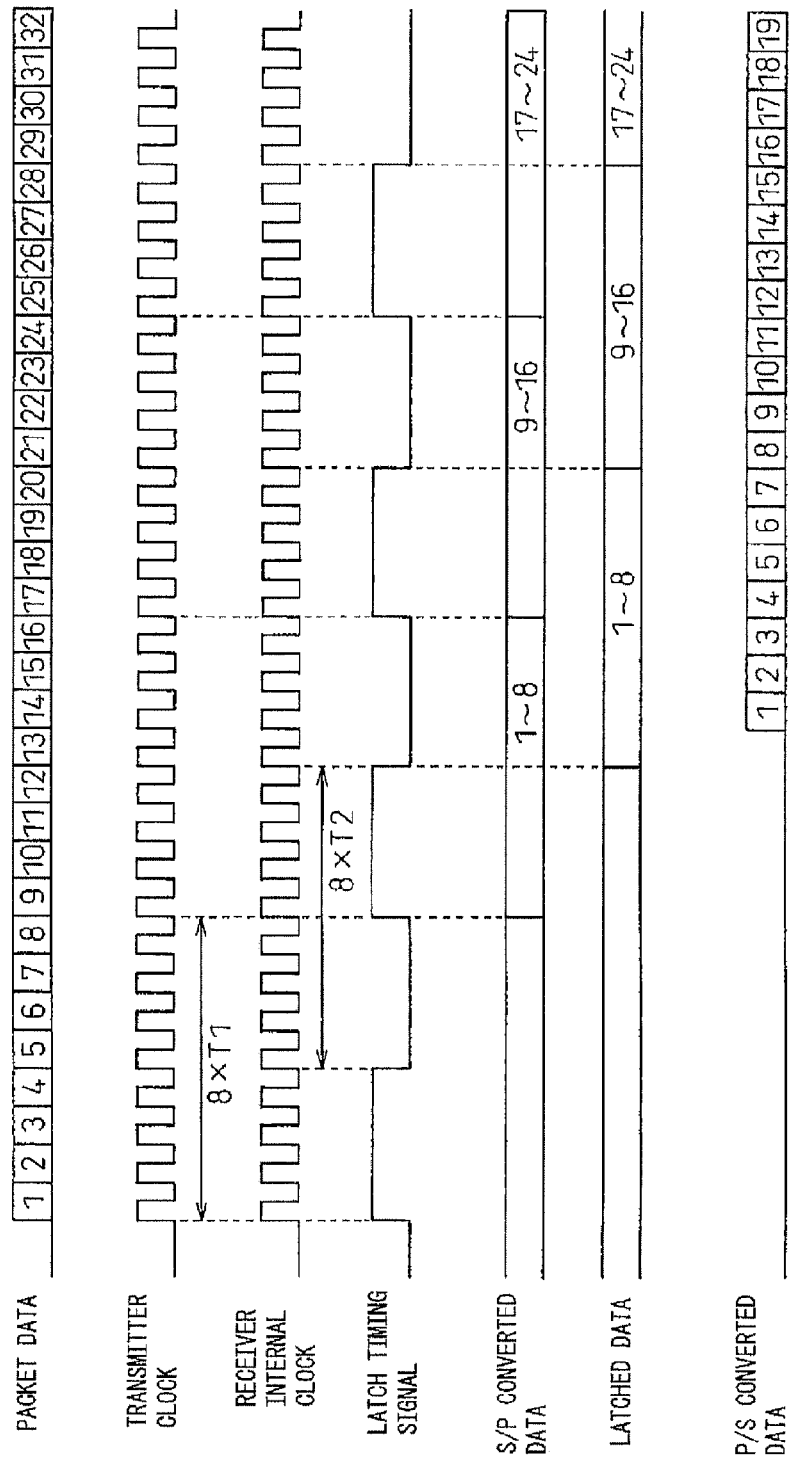
FIG. 4 is a time chart for illustrating the clock change process depicted in FIG. 3.
Figure 5A:
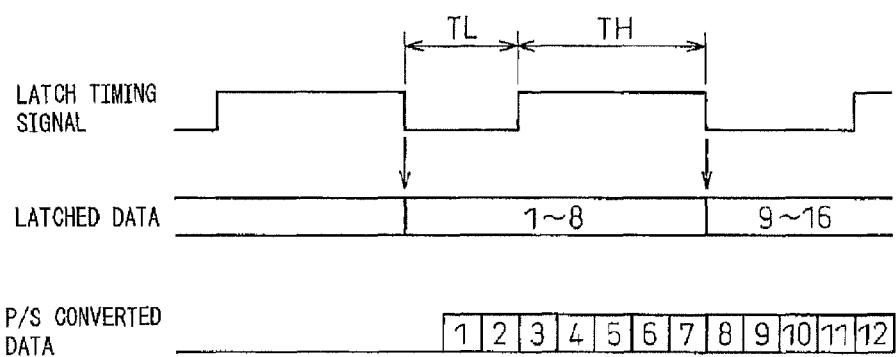
FIG. 5A is a diagram illustrating the case where the transmitter clock is faster than the receiver internal clock.
Figure 5B:
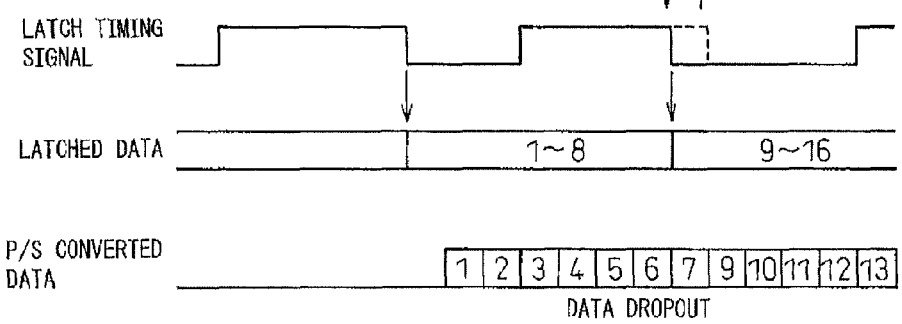
FIG. 5B is a diagram illustrating how a data dropout occurs in the case of FIG. 5A.
Figure 6A:
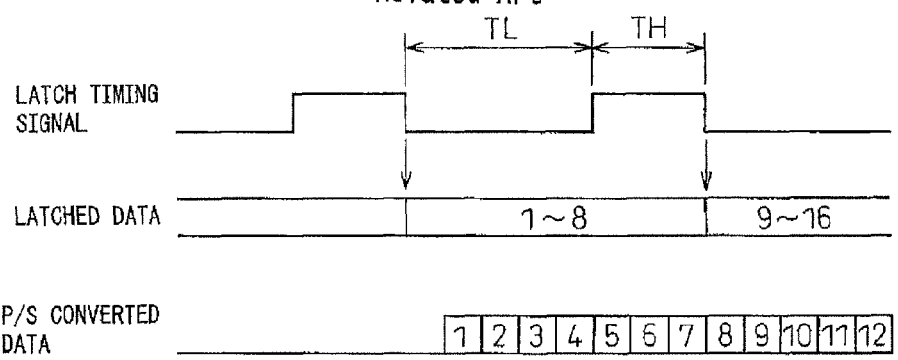
FIG. 6A is a diagram illustrating the case where the receiver internal clock is faster than the transmitter clock.
Figure 6B:
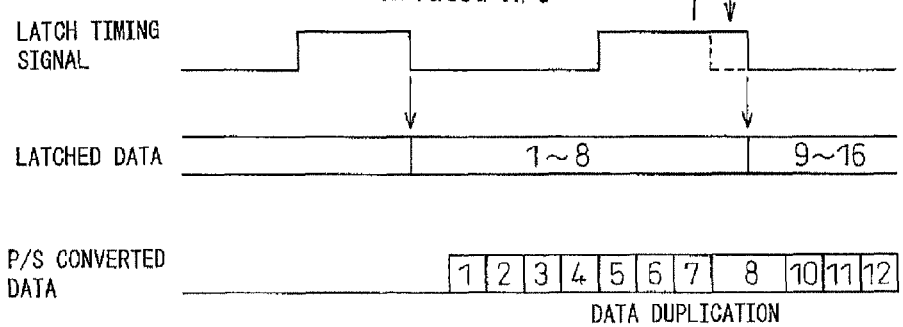
FIG. 6B is a diagram illustrating how data duplication occurs in the case of FIG. 6A.

The clock change method will be explained with reference to FIG. 7. The signal in the uppermost first row of the time chart depicted in FIG. 7 indicates received the serial data sequence synchronized to the first clock, and the numbers indicate the orders of the bits contained in the serial data. The signal in the second row indicates the first clock, and the synchronization signal in the third row is a signal having a period equal to (the period of the first clock)□ (the bit width of the serial-to-parallel converted data) and defines the timing for the serial-to-parallel conversion.

The signal in the fourth row indicates the second clock, and the timing indication signal in the fifth row is a signal having a period equal to (the period of the second clock)□ (the bit width of the serial-to-parallel converted data) and defines the timing for latching the serial-to-parallel converted data into the data storing circuit. The signal in the sixth row indicates the serial-to-parallel converted data, and the signal in the seventh row indicates the parallel data stored in the data storing circuit. The numbers given alongside the signals in the sixth and seventh rows indicate the orders of the bits in the serial data depicted in the first row. The signal in the eighth row indicates the data obtained by converting the parallel data stored in the data storing circuit into the serial data synchronized to the second clock.

As depicted, in the above method, each time the reception of packet data is started at time t1, the timing adjustment, i.e., the adjustment of the latch timing signal, is performed at time t4 in synchronized fashion. In this adjustment, the phase of the latch timing indication signal is adjusted so that the latch timing occurs a predetermined time after the occurrence of the serial-parallel conversion timing (time t2). After that, the latch timing indication signal is generated as a free-running signal based on the second clock. When the bit width of the serial-to-parallel converted data is referred to as just the "bit width" in this passage, the latch timing indication signal is generated so that each time the second clock occurs as many times as the number of the bit width, the latch timing indication signal changes once to indicate the latch timing.

By determining the timing for the latch timing adjustment so that the timing adjustment is made each time the packet data is received, the timing adjustment can be done within a period in which the contents of the data storing circuit are not valid, for example, within an interframe gap period inserted between packets or within a period in which a signal received during a no-data period known to exist in a packet is stored in the data storing circuit.

In the example illustrated in FIG. 7, for example, data immediately preceding the start of the packet is stored in the data storing circuit during the period that immediately follows time t3. If there is an interframe gap between each packet, the latched data is not valid data; therefore, if the timing adjustment is made by adjusting the time interval up to time t4 at which the first latch timing occurs after time t3, the timing adjustment can be done without corrupting the packet data.

The timing for the timing adjustment may be determined so that the timing adjustment is made after a predetermined time has elapsed from the start of the reception of each packet or from the end of the reception of each packet. If the parallel data converted from the serial data synchronized to the first clock contains the packet starting data, the timing for the timing adjustment may be determined so that the timing adjustment is made when latching this parallel data.

The bit width of the parallel data converted from the serial data synchronized to the first clock may be set smaller than one half of the interframe gap provided between each packet. By thus setting the bit width of the parallel data, at least one piece of parallel data that does not contain any valid data can be generated; therefore, if the timing adjustment is made during the period when this parallel data is stored in the data storing circuit, data corruption can be prevented in a more reliable manner.

Further, the bit width of the parallel data converted from the serial data synchronized to the first clock may be determined so that the repetition period of the conversion timing for converting the serial data to the parallel data becomes larger than the allowable range for the clock deviation between the first and second clocks that is allowed when processing one packet.

According to the above clock change device and method, the clock change can be achieved using a simple configuration with reduced memory usage. Furthermore, according to the above clock change device and method, the chance of packet data corruption can be eliminated or reduced.

Figure 8:
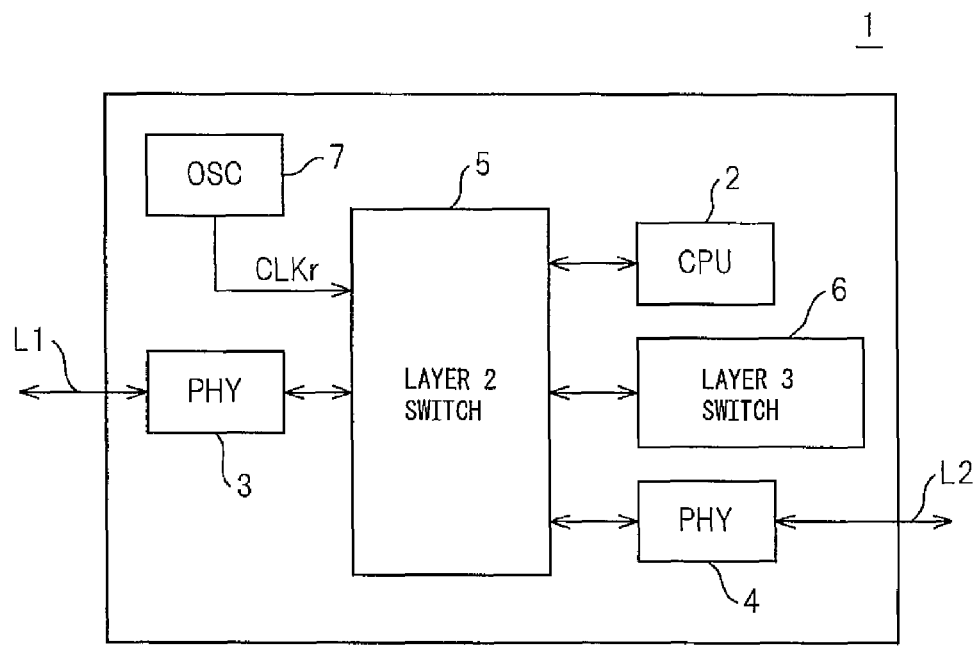
FIG. 8 is a diagram schematically illustrating the configuration of a receiver according to an embodiment.

An embodiment will be described below with reference to the accompanying drawings. FIG. 8 is a diagram schematically illustrating the configuration of a receiver according to the embodiment. The receiver 1 is an information processing apparatus having a function for receiving Ethernet (registered trademark) packet data, and includes a central processing unit (CPU) 2, physical layer interfaces (PHYs) 3 and 4, a layer-2 switch 5, a layer-3 switch 6, and an oscillator (OSC) 7. The central processing unit 2 controls the entire operation of the receiver 1, which is an information processing apparatus such as a computer, and executes computer programs stored in a storage device not depicted. The physical layer interfaces 3 and 4 each perform conversion between an actual electrical signal flowing on an Ethernet (registered trademark) line L1 or L2 and a logic signal handled by a digital processing circuit within the receiver 1.

The layer-2 switch 5 performs the routing of a received packet signal based on the MAC address contained therein, and transfers the packet signal to an appropriate port in accordance with the MAC address. On the other hand, the layer-3 switch 6 performs the routing of a received packet signal based on the IP address contained therein, and transfers the packet signal to an appropriate port in accordance with the IP address. The oscillator (OSC) 7 supplies a receiver internal clock CLKr which is used for the operation of the receiver 1.

Figure 9:
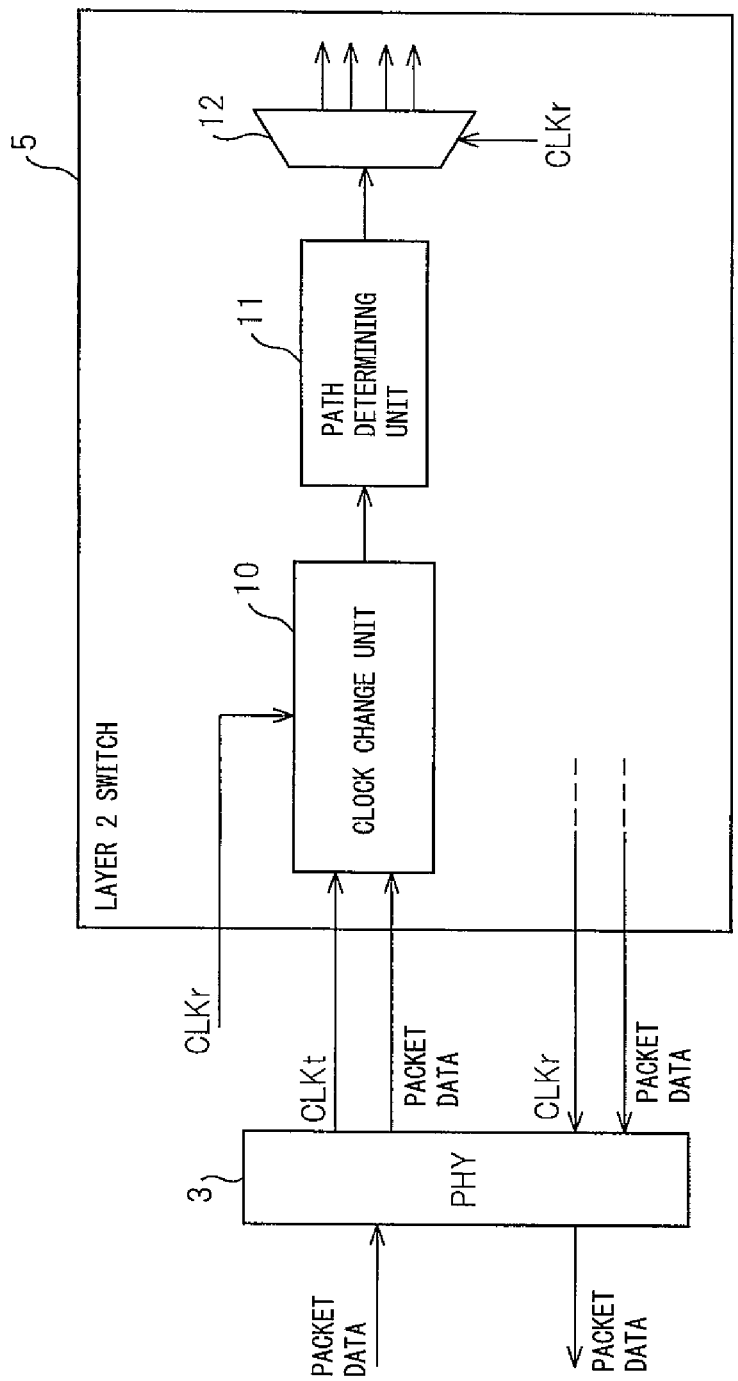
FIG. 9 is a diagram schematically illustrating the configuration of a layer-2 switch depicted in FIG. 8.

FIG. 9 is a diagram schematically illustrating the configuration of the layer-2 switch 5 depicted in FIG. 8. The layer-2 switch 5 includes a clock change unit 10 which converts the packet data of serial form received from the physical layer interface 3 into packet data synchronized to the receiver internal clock CLKr generated by the oscillator 7, a path determining unit 11 which determines a path for the packet data in accordance with the MAC address of the packet data, and a switching unit 12 which outputs the packet data to the port corresponding to the thus determined path.

The packet data received from the physical layer interface 3 is serial data synchronized to a given transmitter clock CLKt; here, the physical layer interface 3 may extract this transmitter clock CLKt from the received serial data. If there is another device that receives a serial signal synchronized to the same transmitter clock CLKt, the transmitter clock CLKt extracted by this device may be used.

Figure 10:
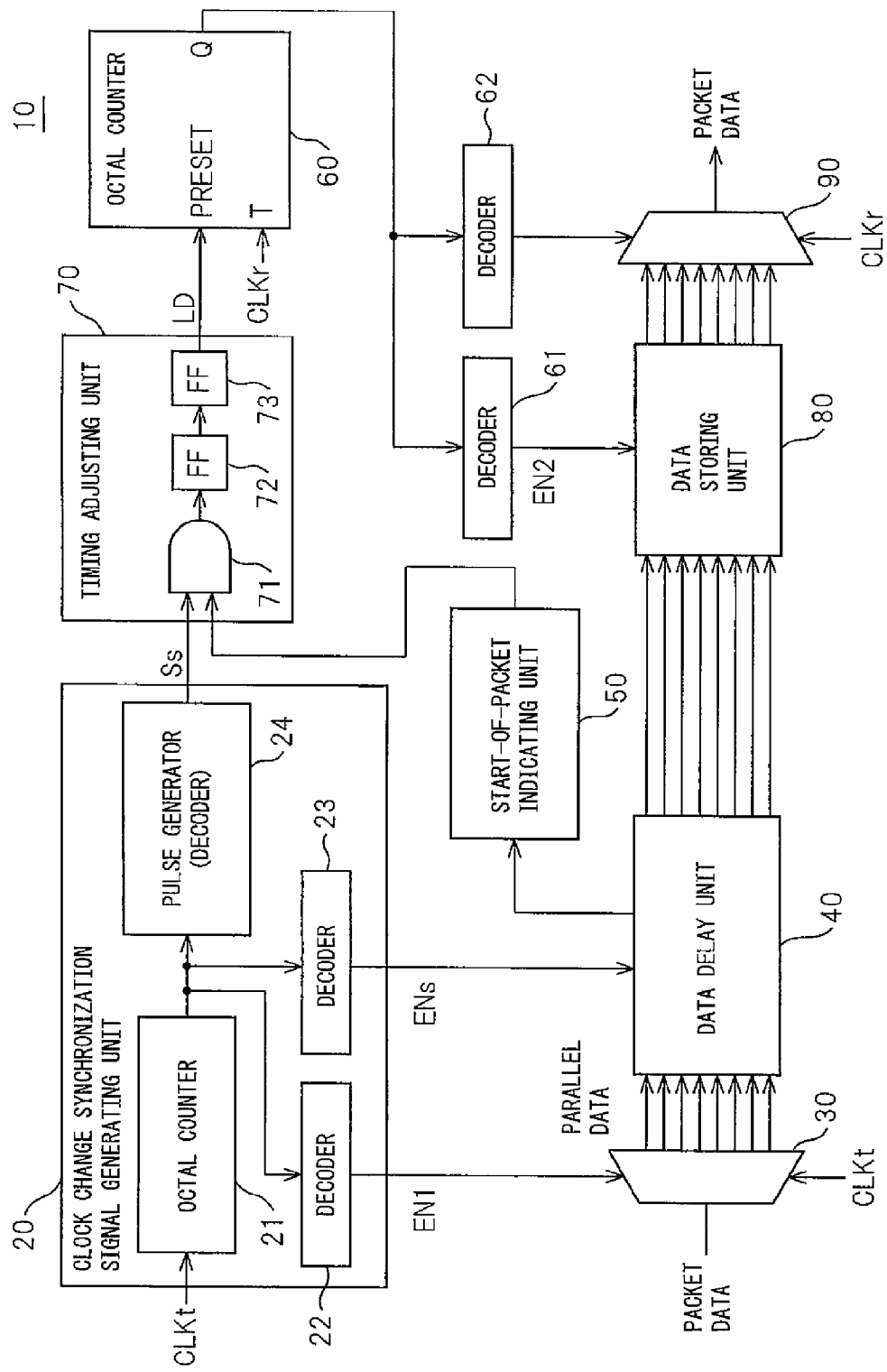
FIG. 10 is a diagram illustrating a first configuration example of a clock change unit depicted in FIG. 9.

FIG. 10 is a diagram illustrating a first configuration example of the clock change unit 10 depicted in FIG. 9. The clock change unit 10 includes a clock change synchronization signal generating unit 20, a serial-parallel conversion unit 30 which converts serial data into 8-bit parallel data, a data delay unit 40, a start-of-packet indicating unit 50, an octal counter 60, a timing adjusting unit 70, a data storing unit 80, and a parallel-serial conversion unit 90 which converts the 8-bit parallel data into serial data. In the following description, the bit width of the parallel data that the serial-parallel conversion unit 30 and the parallel-serial conversion unit 90 handle may be referred to as the "parallel bit number." In the present embodiment, the parallel bit number is 8; however, the parallel bit number is not limited to this particular number, but other bit counts, such as 4 bits, 16 bits, and 32 bits, may be used.

The clock change synchronization signal generating unit 20 generates a serial-parallel conversion enable signal EN1 that indicates the timing for the serial-parallel conversion unit 30 to convert the packet data received from the physical layer interface 3 into parallel data. The clock change synchronization signal generating unit 20 also generates a shift enable signal ENs for causing a shift register in the parallel data delay unit 40 to shift the parallel data in the data delay unit 40. The data delay unit 40 delays the parallel data supplied from the serial-parallel conversion unit 30 by a predetermined number of clock cycles. The clock change synchronization signal generating unit 20 further generates a synchronization signal Ss synchronized to the serial-parallel conversion enable signal EN1.

The clock change synchronization signal generating unit 20 includes an octal counter 21, decoders 22 and 23 which output the serial-parallel conversion enable signal EN1 and the shift enable signal ENs, respectively, and a pulse generator 24 which generates the synchronization signal Ss. The decoder 22 outputs a value "H" only during a period when the octal counter 21 outputs a specific value and a value "L" during other periods, thereby, generates the serial-parallel conversion enable signal EN1 which is held at "H" during one clock cycle each time the octal counter 21 counts the transmitter clock CLKt as many times as the parallel bit number, that is, eight clock cycles.

When a rising edge occurs in the serial-parallel conversion enable signal EN1, i.e., each time the transmitter clock CLKt occurs as many times as the parallel bit number (eight clock cycles), the serial-parallel conversion unit 30 identifies the received bit at that instant as being the first bit of the 8-bit signal, and converts the serial data into the parallel data. The decoder 23 outputs a value "H" only during a period when the octal counter 21 outputs a specific value and a value "L"

during other periods, thereby, generates the shift enable signal ENs which is held at "H" during one clock cycle each time the octal counter 21 counts the transmitter clock CLKt as many times as the parallel bit number, that is, eight clock cycles. When a rising edge occurs in the shift enable signal ENs, i.e., each time the transmitter clock CLKt occurs as many times as the parallel bit number (eight clock cycles), the data delay unit 40 shifts the parallel data along the shift register in the data delay unit 40.

Further, the pulse generator 24 outputs a value "H" only during a period when the octal counter 21 outputs a specific value and a value "L" during other periods, thereby, generates the synchronization signal Ss which is held at "H" during one clock cycle each time the octal counter 21 counts the transmitter clock CLKt as many times as the parallel bit number, that is, eight clock cycles. The pulse generator 24 may be constructed using a decoder.

The data delay unit 40 holds a predetermined number of bits of parallel data in the shift register internal to the data delay unit 40 by delaying the parallel data supplied from the serial-parallel conversion unit 30. The number of bits of the parallel data to be held in the data delay unit 40 is set large enough to hold the preamble inserted at the head of the packet data received by the receiver 1. FIG. 11 is a diagram illustrating the format of an Ethernet (registered trademark) packet. As illustrated, the packet data carries a 56-bit preamble and an 8-bit start frame delimiter (SFD) at its head.

Figure 12A:
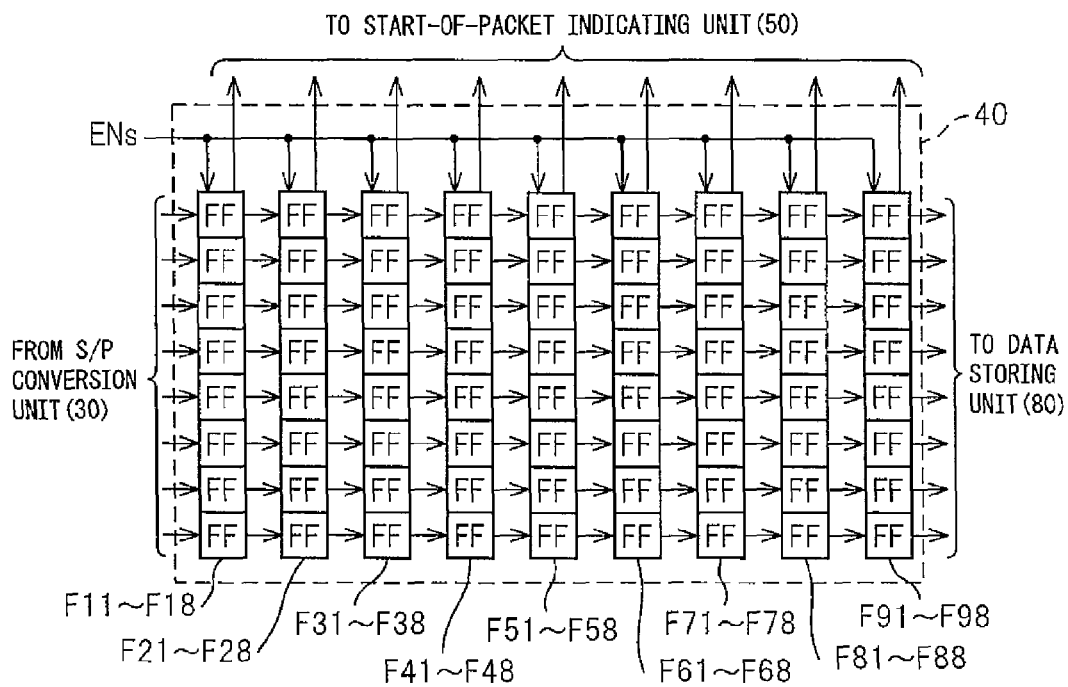
FIG. 12A is a diagram illustrating the configuration of a data delay unit depicted in FIG. 10.

FIG. 12A is a diagram illustrating the configuration of the data delay unit 40 depicted in FIG. 10. The data delay unit 40 includes a shift register constructed from nine stages of eight paralleled flip-flops, F11 to F18, F21 to F28, F31 to F38, F41 to F48, F51 to F58, F61 to F68, F71 to F78, F81 to F88, and F91 to F98, connected in series to hold the 8-bit parallel data output from the serial-parallel conversion unit 30. Accordingly, the data delay unit 40 can hold 8 ×9 =72 bits of data. Since each interstage shift occurs in synchronism with the rising edge of the shift enable signal ENs, the data is shifted each time the transmitter clock CLKt occurs as many times as the parallel bit number (eight clock cycles).

The start-of-packet indicating unit 50 reads the data held in the flip-flops F11 to F18, F21 to F28, F31 to F38, F41 to F48, F51 to F58, F61 to F68, F71 to F78, F81 to F88, and F91 to F98 in the data delay unit 40, and determines whether the preamble and start frame delimiter inserted at the head of the packet data are held in these flip-flops. If the preamble and start frame delimiter are held in any given stages of flip-flops, the start-of-packet indicating unit 50 outputs a start-of-packet indication signal which is held at "H" during a period when the first 8-bit parallel data, including the data at the head of the packet data, is subsequently output from the data delay unit 40, and which is held at "L" during other periods.

A decoder 61 in cooperation with the octal counter 60 generates a latch timing indication signal EN2 that indicates the timing for latching the parallel data, output from the data delay unit 40, into the data storing unit 80. A decoder 62 in cooperation with the octal counter 60 generates a parallel-serial conversion timing signal that indicates the timing for converting the parallel data stored in the data storing unit 80 into the serial data synchronized to the receiver internal clock CLKr.

The octal counter 60 counts the number of clock cycles of the receiver internal clock CLKr. The decoder 61 outputs a value "H" only during a period when the octal counter 60 outputs a specific value and a value "L" during other periods, thereby, generates the latch timing indication signal EN2 which is held at "H" during one clock cycle each time the octal counter 60 counts the receiver internal clock CLKr as many times as the parallel bit number (eight clock cycles).

Figure 12B:
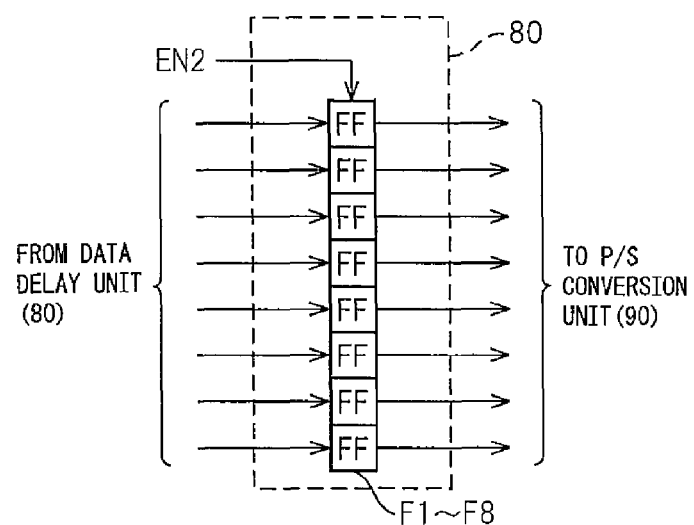
FIG. 12B is a diagram illustrating the configuration of a data storing unit depicted in FIG. 10.

FIG. 12B is a diagram illustrating the configuration of the data storing unit 80 depicted in FIG. 10. The data storing unit 80 includes eight flip-flops F1 to F8 for storing the 8-bit parallel data output from the data delay unit 40, and the parallel data output from the data delay unit 40 is latched into the flip-flops F1 to F8 by the rising edge of the latch timing indication signal EN2.

The decoder 62, depicted in FIG. 10, outputs a value "H" only during a period when the octal counter 60 outputs a specific value and a value "L" during other periods, thereby, generates the the parallel-serial conversion timing signal which is held at "H" during one clock cycle each time the octal counter 60 counts the receiver internal clock CLKr as many times as the parallel bit number (eight clock cycles). When a rising edge occurs in the parallel-serial conversion timing signal, the parallel-serial conversion unit 90 converts the 8-bit parallel data stored in the data storing unit 80 into the serial data synchronized to the receiver internal clock CLKr.

The timing adjusting unit 70 receives the synchronization signal Ss output from the clock change synchronization generating unit 20 and the start-of-packet indication signal output from the start-of-packet indicating unit 50, and writes a specific count value to a preset (PRESET) terminal of the octal counter 60 when the synchronization signal Ss and the start-of-packet indication signal are both at "H". Reference numeral 71 is an AND circuit which performs a logical AND operation between the synchronization signal Ss and the start-of-packet indication signal, and reference numerals 72 and 73 are flip-flop devices for addressing metastable states. When the output of the flip-flop value LD to the preset (PRESET) terminal of the octal counter 60. The synchronization signal Ss is at "H" when the octal counter 21 outputs a predetermined count value. Accordingly, by setting the count value of the octal counter 60 to the predetermined value LD at a timing synchronized to the synchronization signal Ss, the difference between the count value of the octal counter 21 and the count value of the octal counter 60 becomes equal to the desired predetermined value. As a result, since the interval between the time the rising edge of the synchronization signal Ss occurs and the time the rising edge of the latch timing indication signal EN2 occurs provides the predetermined time interval, the time interval between the serial-parallel conversion timing synchronized to the synchronization signal Ss and the data latch timing of the data storing unit 80 is set to the predetermined time interval.

With the above configuration, the timing adjusting unit 70 adjusts the time interval between the rising edge of the synchronization signal Ss and the rising edge of the latch timing indication signal EN2. Stated another way, the timing adjusting unit 70 adjusts the data latch timing of the data storing unit 80 so that the data latch timing of the data storing unit 80 occurs after the predetermined time has elapsed from the occurrence of the serial-parallel conversion timing of the serial-parallel conversion unit 30.

Figure 13:
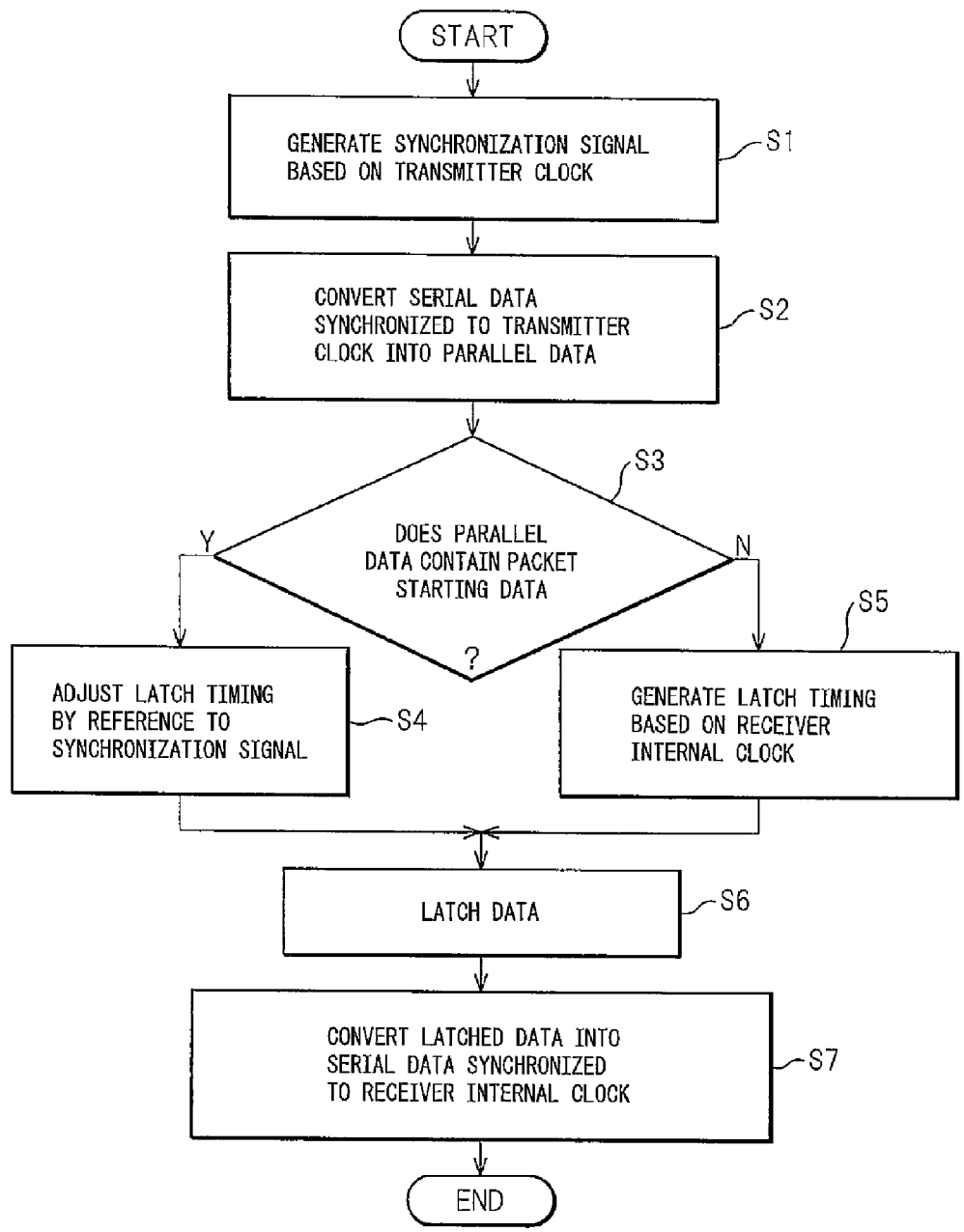
FIG. 13 is a flowchart illustrating a clock change method according to the embodiment.

FIG. 13 is a flowchart illustrating the clock change method according to the embodiment. FIG. 14 is a time chart (part 1) illustrating the signals at various parts of the clock change unit 10. The signal in the uppermost first row of the time chart depicted in FIG. 14 indicates the received serial data sequence synchronized to the transmitter clock CLKt, and the numbers indicate the orders of the bits contained in the serial data. The signal in the second row indicates the transmitter clock CLKt, and the signal in the third row indicates the serial-parallel conversion enable signal EN1. The time chart of the shift enable signal ENs can be the same as that of the serial-parallel conversion enable signal EN1.

The signal in the fourth row indicates the serial-to-parallel converted data, and the signal in the fifth row indicates the parallel data output from the data delay unit 40. The signal in the sixth row indicates the synchronization signal Ss, the signal in the seventh row indicates the start-of-packet indication signal, and the signal in the eighth row indicates the predetermined count value LD that the timing adjusting unit 70 writes to the preset (PRESET) terminal of the octal counter 60.

FIG. 15 is a time chart (part 2) illustrating the signals at various parts of the clock change unit 10. The signals in the first to fourth rows of the time chart depicted in FIG. 15 are the same as those in the fifth to eighth rows of the time chart depicted in FIG. 14, i.e., the parallel data output from the data delay unit 40, the synchronization signal Ss, the start-of-packet indication signal, and the count value LD, respectively. The signal in the fifth row of the time chart depicted in FIG. 15 indicates the receiver internal clock CLKr, the signal in the sixth row indicates the latch timing indication signal, the signal in the seventh row indicates the parallel data latched into the data storing unit 80, and the signal in the eighth row indicates the output data of the parallel-serial conversion unit 90 obtained by converting the parallel data stored in the data storing unit 80 into serial data. In the parallel data depicted in the fourth and fifth rows of FIG. 14 and the parallel data depicted in the first and seven rows of FIG. 15, the numbers given alongside the signals indicate the bits in the serial data depicted in the first row of FIG. 14 that correspond to the bits contained in the parallel data.

In step S1 of FIG. 13, the clock change synchronization signal generating unit 20 generates the synchronization signal Ss based on the transmitter clock CLKt. Each time the transmitter clock CLKt is counted as many times as the parallel bit number (eight clock cycles), the synchronization signal Ss goes to "H" and remains at "H" for two clock cycles and remains at "L" during other periods, as depicted in the sixth row of FIG. 14 and the second row of FIG. 15.

In step S2, the serial-parallel conversion unit 30 converts the serial data synchronized to the transmitter clock CLKt into parallel data. More specifically, the clock change synchronization signal generating unit 20 generates the serial-parallel conversion enable signal EN1 such as depicted in the third row of FIG. 14. The serial-parallel conversion unit 30 converts the serial data into the parallel data with the timing at which the rising edge of the serial-parallel conversion enable signal EN1 occurs.

In step S3, the start-of-packet indicating unit 50 determines whether the preamble and start frame delimiter are held in the shift register internal to the data delay unit, that is, in any given stages of flip-flops F11 to F18, F21 to F28, F31 to F38, F41 to F48, F51 to F58, F61 to F68, F71 to F78, F81 to F88, and F91 to F98.

If the preamble and start frame delimiter are held in the shift register (step S4), then if the parallel data output during the subsequent 8-bit parallel data output period contains the packet starting data, the value of the start-of-packet indication signal is set to "H" only for the period during which that parallel data is output from the data delay unit 40. For example, in FIG. 14, the start-of-packet indication signal is held at "H" for the period from time t1 to time t2 during which the packet starting data (first to eighth bits) is output from the data delay unit 40. For this purpose, at time t1, the predetermined count value LD is written to the preset (PRESET) terminal of the octal counter 60. As a result, the latch timing of the data storing unit 80 is adjusted by adjusting the phase of the latch timing indication signal EN2 so that the latch timing indication signal depicted in the sixth row of FIG. 15 goes to "H" at time t3 after the predetermined time has elapsed from time t1.

If it is determined in step S3 that the preamble and start frame delimiter are not held in the shift register (step S5), the octal counter 60 generates the latch timing indication signal as a free-running signal based on the receiver internal clock CLKr. That is, the latch timing indication signal EN2 is generated so that the next rising edge occurs after the receiver internal clock CLKr has been counted as many times as the parallel bit number after the occurrence of the previous rising edge. Accordingly, once the phase of the latch timing indication signal EN2 is adjusted in step S4, thereafter the latch timing indication signal is generated as a free-running signal until the starting data of a new packet is latched.

For example, at times t4, t5, and t6, since the data output from the data delay unit 40 is not the packet starting data, the data is latched into the data storing unit 80 by the latch timing indication signal EN2 generated as a free-running signal.

In step S6, the data is latched into the data storing unit 80 by the rising edge of the latch timing indication signal EN2. In step S7, the parallel-serial conversion unit 90 converts the data stored in the data storing unit 80 into the serial data synchronized to the receiver internal clock CLKr.

Figure 16A:
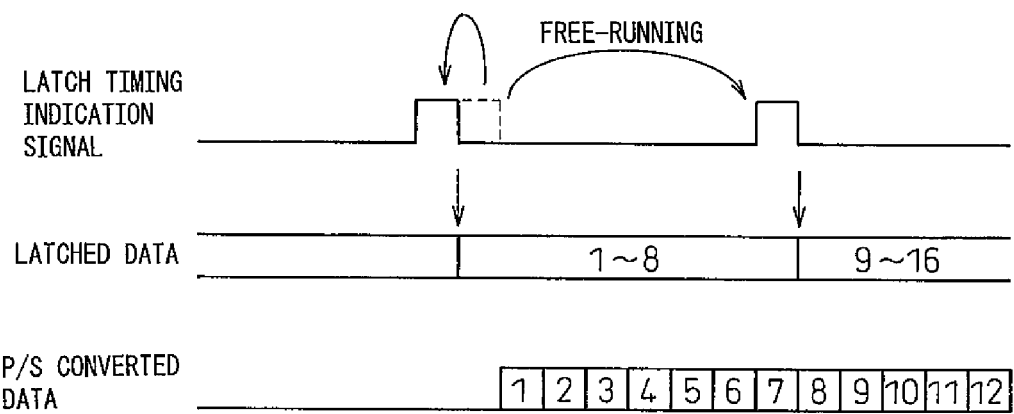
FIG. 16A is a diagram illustrating a timing adjustment when the transmitter clock is faster than the receiver internal clock.

FIG. 16A is a diagram illustrating how the rise timing of the latch timing indication signal EN2 is adjusted when the transmitter clock CLKt is faster than the receiver internal clock CLKr. If the transmitter clock CLKt is faster than the receiver internal clock CLKr, the latch timing indication signal EN2 is progressively delayed with respect to the serial-parallel conversion timing during the period that the latch timing indication signal EN2 is being generated as a free-running signal based on the receiver internal clock CLKr. Accordingly, in the earlier described step S4, the rise timing of the latch timing indication signal EN2 is adjusted in a direction that advances the rise timing. According to the method of the embodiment, such a timing adjustment is made only when latching the packet starting data into the data storing unit 80, and before that, the invalid data preceding the packet starting data is stored in the data storing unit 80; therefore, if the latching timing of the data storing unit 80 is advanced, no dropout occurs in the valid data.

Figure 16B:
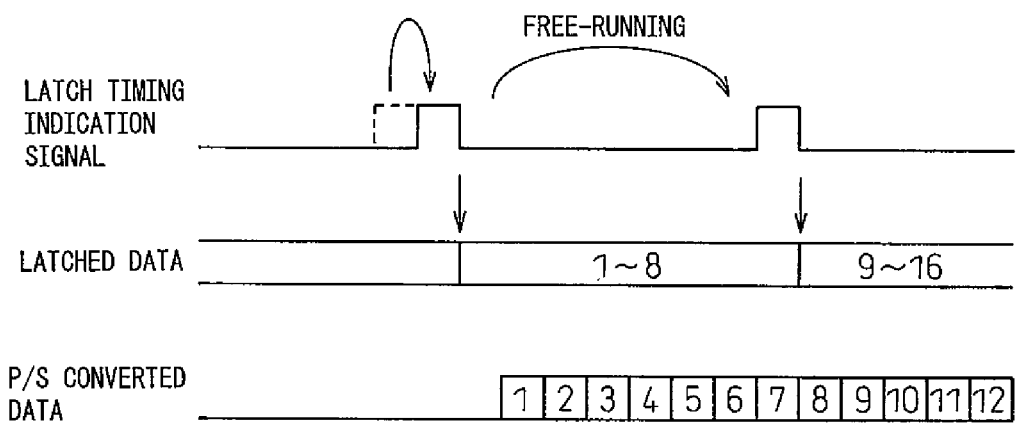
FIG. 16B is a diagram illustrating a timing adjustment when the receiver internal clock is faster than the transmitter clock.

FIG. 16B is a diagram illustrating how the rise timing of the latch timing indication signal EN2 is adjusted when the receiver internal clock CLKr is faster than the transmitter clock CLKt. In this case, the rise timing of the latch timing indication signal EN2 is adjusted in a direction that delays the rise timing. In this case also, since the invalid data is stored in the data storing unit 80 before such a timing adjustment is made, if the latching timing of the data storing unit 80 is delayed, no duplication occurs in the valid data.

In the present embodiment, during the period that one packet is being received, the latching timing of the data storing unit 80 is generated in the form of a free-running signal based on the receiver internal clock CLKr. As a result, if there is a frequency deviation between the transmitter clock CLKt and the receiver internal clock CLKr, the latch timing is gradually displaced, during the reception of the packet, from the position adjusted at the beginning of the packet. According to the present embodiment, if it is assumed that a margin of two clock cycles is provided to ensure the setup time and hold time for the serial-to-parallel converted data, then unvarying period of parallel data (eight clock cycles)/2− margin (2 clock cycles) =2 clock cycles, which means that if the amount of latching timing displacement that occurs during the reception of one packet is within plus or minus two clock cycles, the serial-to-parallel converted data can be latched into the data storing unit 80 only once in each parallel data output period. In the case of an Ethernet (registered trademark) packet with a maximum length of 1526 bytes (12,208 bits), if the error is smaller than 1/6104 clock periods per bit (the clock deviation is smaller than 163 ppm), the allowable variation range of the latch timing is within ±2 clock cycles.

If the packet used is a jumbo packet with a maximum length of 9600 bytes (76,800 bits), the parallel bit number is set to 32 bits. By thus a making parallel data remain unvarying during 32 clock cycles, the allowable variation range of the latch timing then being within ±14 clock cycles, a clock deviation up to 182 ppm is allowable. Since the interframe gap (IFG) of Ethernet (registered trademark) packet data is usually 12 bytes =96 bits, if the parallel bit number is set to one half of that, i.e., 48 bits or smaller, there arises no possibility that valid packet data is contained in the parallel data one period before the parallel data containing the packet starting data; this serves to significantly reduce the chance of the packet data being corrupted by the timing adjustment.

Figure 17:
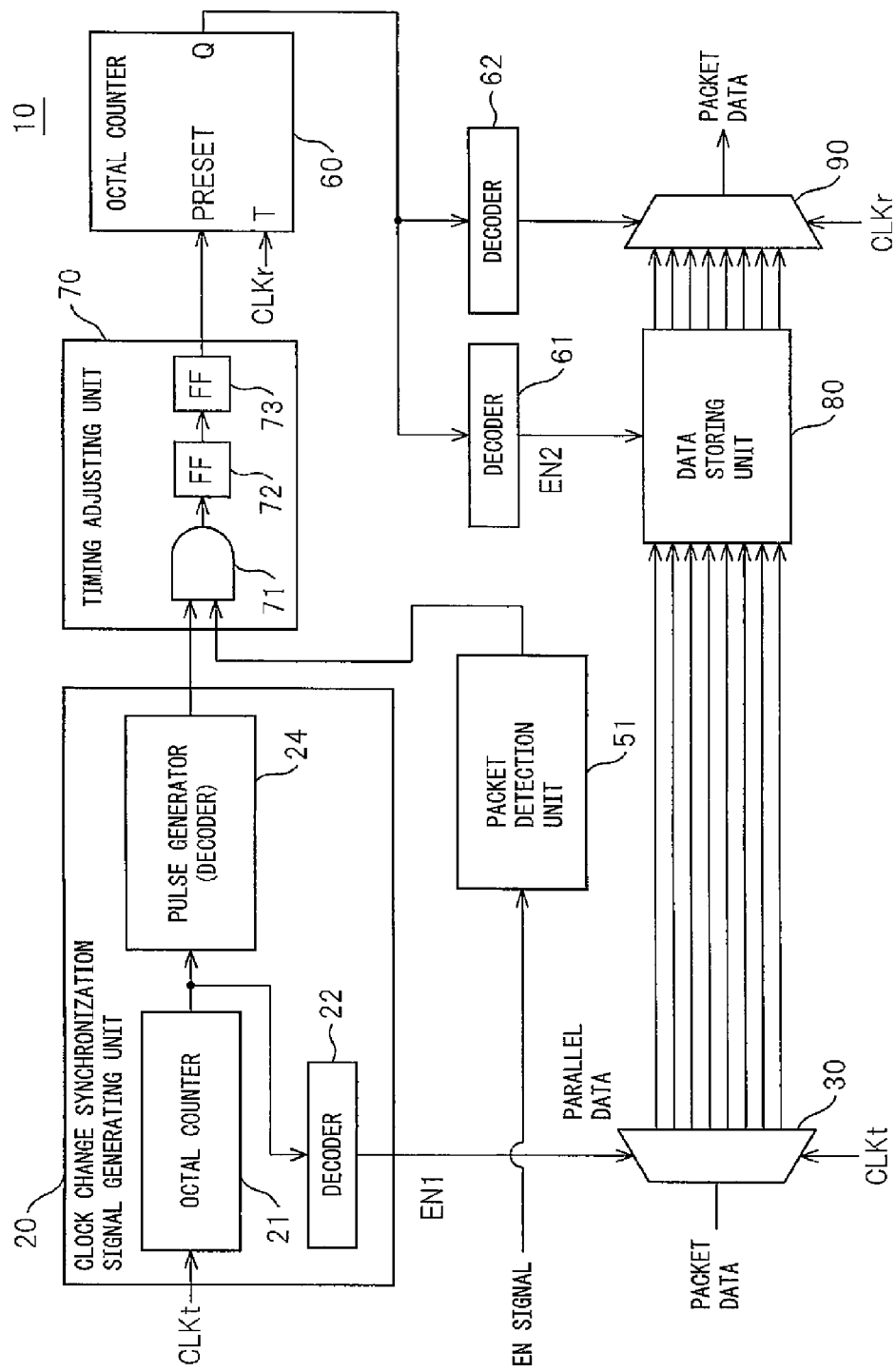
FIG. 17 is a diagram illustrating a second configuration example of the clock change unit depicted in FIG. 9.

FIG. 17 is a diagram illustrating a second configuration example of the clock change unit 10 depicted in FIG. 9. In FIG. 17, the same component elements as those in FIG. 10 are designated by the same reference numerals. If the received packet signal is a packet signal, such as a signal conforming to R-GMII, an enable signal (EN signal) having a different logic value when the packet signal exists than when it does not is received together with the packet signal.

The illustrated example includes a packet detection unit 51 which takes the enable signal as input and generates a packet detection signal by detecting the presence of a packet.

The packet detection unit 51 detects the beginning of a packet by detecting a change in the enable signal. Then, after a known time interval has elapsed that defines the time interval to elapse from the detection of the beginning of the packet until the first 8-bit parallel data containing the starting data of the packet is output from the serial-parallel conversion unit 30, a start-of-packet indication signal is output which is held at "H" during the period that the first 8-bit parallel data is output from the serial-parallel conversion unit 30 and at "L" during other periods.

The packet detection unit 51 may detect the completion of the packet reception by detecting a change in the enable signal. In this case, after a known time interval has elapsed that defines the time interval to elapse from the detection of the completion of the packet reception until the first 8-bit parallel data containing the starting data of the next packet is output from the serial-parallel conversion unit 30, the packet detection unit 51 outputs a start-of-packet indication signal which is held at "H" during the period that the first 8-bit parallel data is output from the serial-parallel conversion unit 30 and at "L" during other periods.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A clock change device comprising:
a serial-parallel conversion unit which converts serial data synchronized to a first clock into parallel data;
a detection unit which detects the head of the parallel data;
a data storing unit which latches the parallel data from the serial-parallel conversion unit with a latch timing that occurs once per every number of clock cycles of a second clock;
a parallel-serial conversion unit which converts the parallel data stored in the data storing unit into the serial data synchronized to the second clock; and
a timing adjusting unit which, each time a packet of serial data synchronized to the first clock is received, performs a timing adjustment to adjust the latch timing during the period from the receipt of the serial data to the latch timing of the head of the parallel data, so that the latch timing occurs a time after occurrence of a conversion timing of the serial-parallel conversion unit.

2. The clock change device as claimed in claim 1, wherein the timing adjusting unit performs the timing adjustment when data stored in the data storing unit is a signal received during an interframe gap provided between each packet.

3. The clock change device as claimed in claim 2, wherein the timing adjusting unit performs the timing adjustment after a time has elapsed after starting the reception of the packet.

4. The clock change device as claimed in claim 2, wherein the timing adjusting unit performs the timing adjustment after a time has elapsed after completing the reception of the packet.

5. The clock change device as claimed in claim 2, wherein,
the detection unit comprises a start-of-packet indicating unit which generates a start-of-packet indication signal that indicates whether or not the parallel data converted by the serial-parallel conversion unit from the serial data synchronized to the first clock contains starting data of the packet as the head of the parallel data, and
the timing adjusting unit performs the timing adjustment when latching the parallel data containing the starting data.

6. The clock change device as claimed in claim 2, wherein bit width of the parallel data output from the serial-parallel conversion unit is smaller than one half of the interframe gap provided between each packet.

7. The clock change device as claimed in claim 2, wherein bit width of the parallel data output from the serial-parallel conversion unit is determined so that repetition period of the conversion timing of the serial-parallel conversion unit becomes larger than an allowable range for a clock deviation between the first and second clocks that is allowed when processing one packet.

8. A clock change method comprising:
converting serial data synchronized to a first clock into parallel data;
detecting the head of the parallel data;
latching the serial-to-parallel converted data into a designated data storing circuit with a latch timing that occurs once per every number of clock cycles of a second clock; and
converting the latched parallel data into the serial data synchronized to the second clock, and wherein:
each time a packet of serial data synchronized to the first clock is received, a timing adjustment is performed to adjust the latch timing during the period from the receipt of the serial data to the latch timing of the head of the parallel data, so that the latch timing occurs a time after occurrence of a conversion timing for converting the serial data synchronized to the first clock into the parallel data.

9. The clock change method as claimed in claim 8, wherein the timing adjustment is performed when data stored in the data storing circuit is a signal received during an interframe gap provided between each packet.

10. The clock change method as claimed in claim 9, wherein the timing adjustment is performed after a time has elapsed after starting the reception of the packet.

11. The clock change method as claimed in claim 9, wherein the timing adjustment is performed after a time has elapsed after completing the reception of the packet.

12. The clock change method as claimed in claim 9, wherein if the parallel data converted from the serial data synchronized to the first clock contains starting data of the packet as the head of the parallel data, the timing adjustment is performed when latching the parallel data.

13. The clock change method as claimed in claim 9, wherein bit width of the parallel data converted from the serial data synchronized to the first clock is smaller than one half of the interframe gap provided between each packet.

14. The clock change method as claimed in claim 9, wherein bit width of the parallel data converted from the serial data synchronized to the first clock is determined so that repetition period of the serial-to-parallel data conversion timing becomes larger than an allowable range for a clock deviation between the first and second clocks that is allowed when processing one packet.

* * * * *